United States Patent [19]

Hurst

[11] 4,078,298

[45] Mar. 14, 1978

[54] CABLE INSTALLING AND ADJUSTING METHOD

[76] Inventor: George P. Hurst, 235 Hill St., Jackson, Calif. 95642

[21] Appl. No.: 763,188

[22] Filed: Jan. 27, 1977

[51] Int. Cl.² ............................................. B23P 19/00
[52] U.S. Cl. .................................. 29/526 R; 29/452;
                                                    403/312; 403/407
[58] Field of Search ........................ 29/452, 461, 526;
          57/22, 23, 142; 14/22; 140/111; 403/41, 215,
                                                    312, 406, 407

[56] References Cited

U.S. PATENT DOCUMENTS

| 689,610 | 12/1901 | Gamalielson | 14/22 |
| 706,393 | 8/1902 | Darling | 403/312 |
| 1,099,390 | 6/1914 | Mulligan | 403/215 |
| 3,769,685 | 11/1973 | Noda | 29/526 |

*Primary Examiner*—Lowell A. Larson
*Attorney, Agent, or Firm*—Townsend and Townsend

[57] ABSTRACT

Apparatus and method for installing or replacing each of a plurality of cables, each of which is in the form of a loop extending over one of a plurality of sheaves and below a generally horizontally disposed kiln or drum for suspending said kiln or drum from said sheaves for rotation, while the other sheaves and cables support said kiln or drum. Such apparatus includes a connector releasably connecting terminal end portions of said cable for forming said loop, and elements cooperating with such connector and cable for effecting the releasable connection between said portions of each cable, and the seating and tensioning of each newly installed cable to take a share of the load equal to that of each of the other cables while said load is carried by the other cables.

The steps of the method include preforming a uniform section of each terminal end portion of the new, or replacement cable between first holding forces applied at the ends of each section with corresponding bends, and then, while so held, said cable is slack-positioned over a sheave and below the kiln or drum to form an endless loop disposed in one plane, and said sections are then held by a second holding force. Thereafter, said first holding forces are removed and the loop of said cable between said sections are tensioned by applying a pulling force on one of said sections outwardly of said loop while restricting movement of the other section until the tension of said loop is substantially equal to the tension of the corresponding loops of the other cables, and then holding the tension of said one cable against slackening while removing the pulling force from said one of said sections.

8 Claims, 20 Drawing Figures

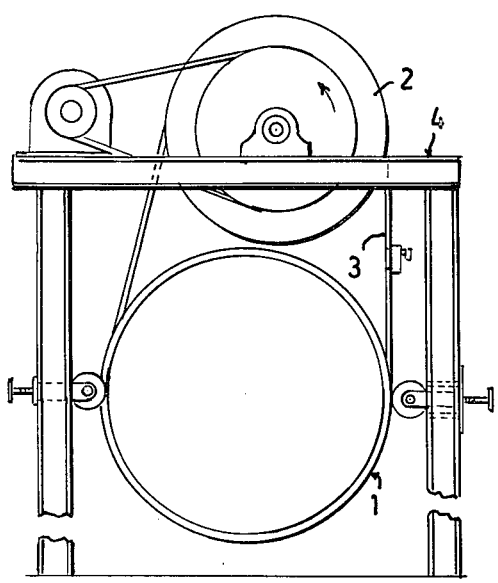
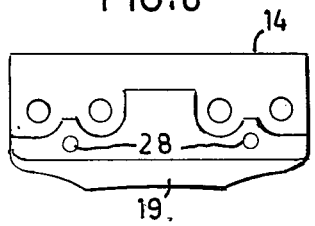
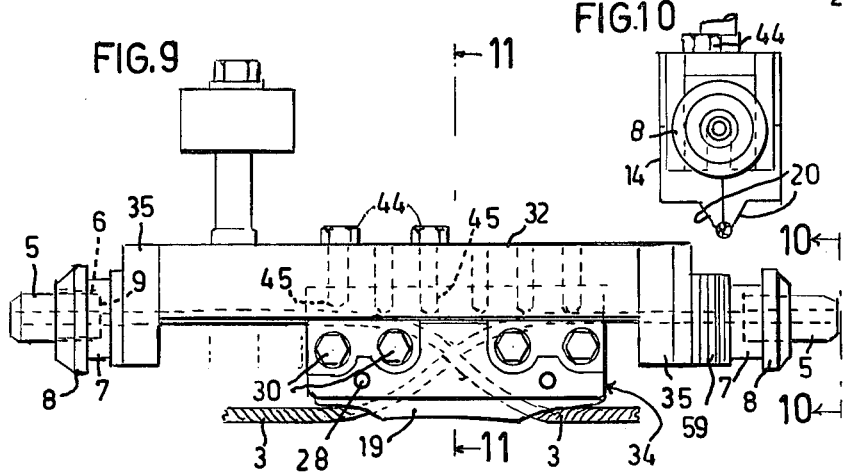
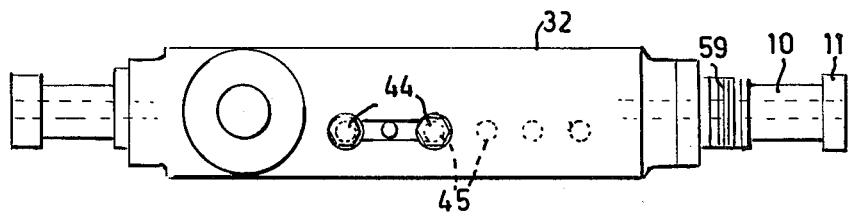
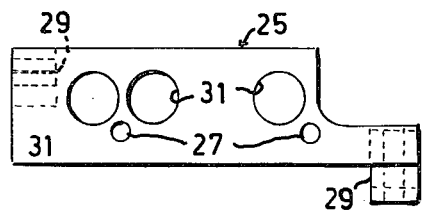
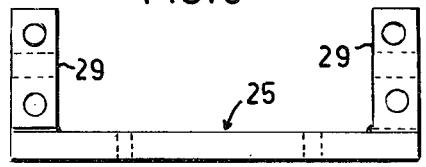
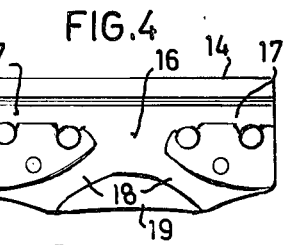
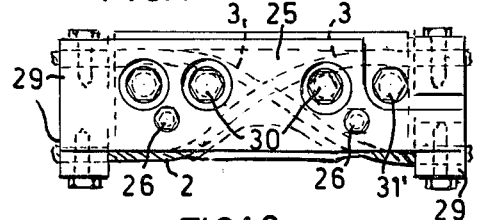
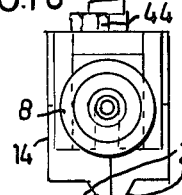
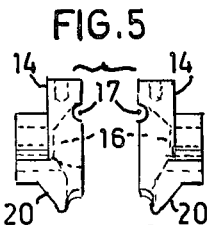
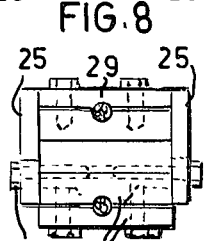
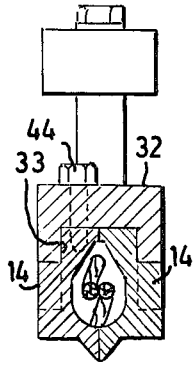

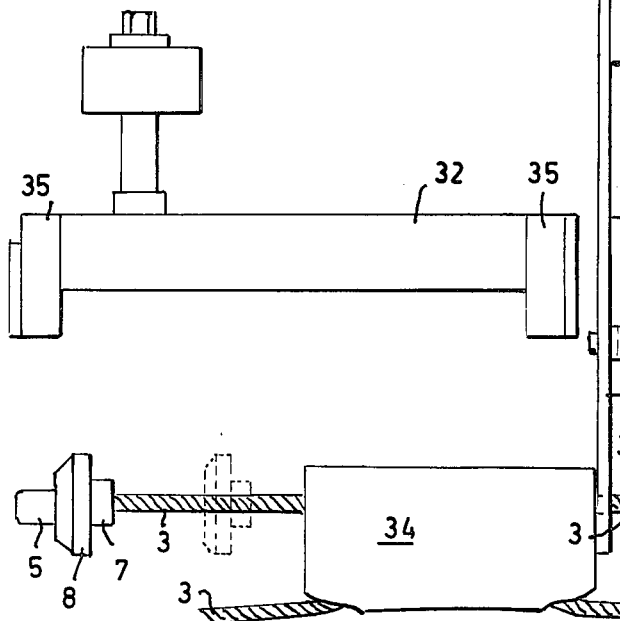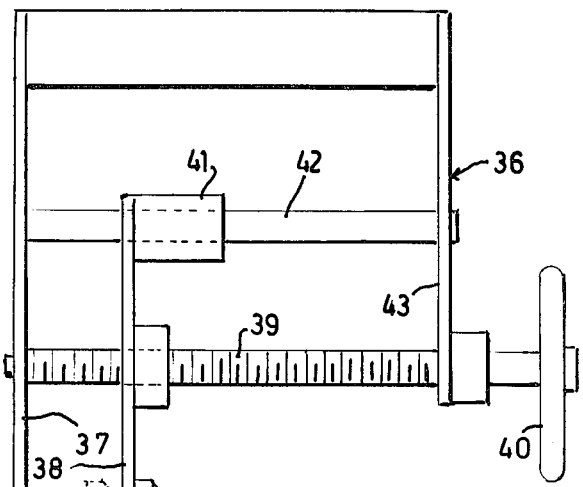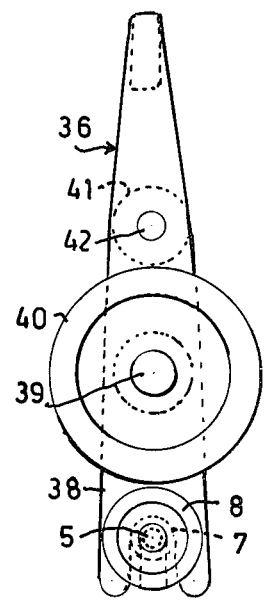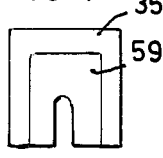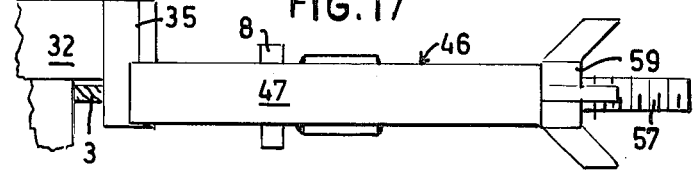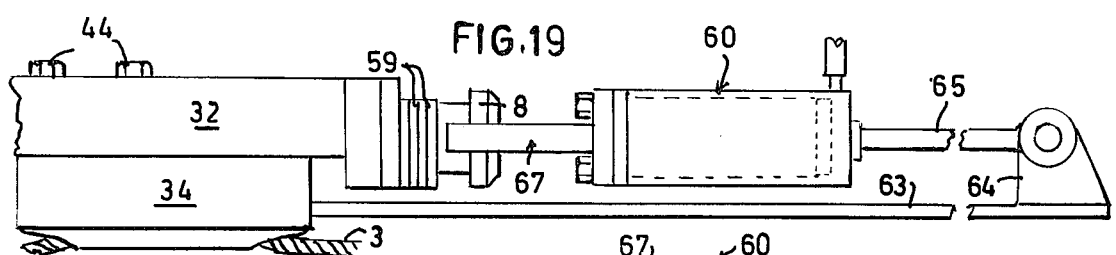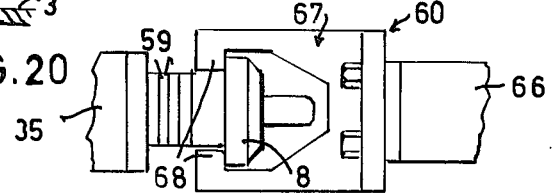

CABLE INSTALLING AND ADJUSTING METHOD

BACKGROUND OF THE INVENTION

My U.S. Pat. Nos. 3,097,837 (July 16, 1963); 3,401,924 (Sept. 17, 1968); and 3,699,433 (June 13, 1972) show developments of cable supported kilns, dryers, and drums during the past decade.

One of the difficulties in installing a single-drum-supporting cable of a set without jacking up the drum or lowering the sheave supports, has been the clamping together of sections of the terminal end portions of the cables where said sections must be slightly bent to follow curved recessess in the clamps so that the portions outwardly of said sections will be generally parallel with, but spaced outwardly of the loop that encircles the sheaves and drum. The section that is clamped preferably extends generally tangentially of the outline of the loop.

The above structure has been found to be satisfactory in providing a compact cable connector, and one that lends itself to application of a mechanism thereon to facilitate the shifting of the cable connector and the terminal end portions of the cable relative to each other longitudinally of the cable for prolonging the life of the cable.

In larger cables, such as used to support brick lined kilns and heavy loads, it has been particularly difficult to clamp together the sections of the cable as above described, since such sections are resilient and strongly resist bending to follow the paths required between the bodies of the cable connectors.

It has also been found difficult to take up the slack in a cable after the end sections have been connected in order to seat the cable in the sheave groove, and to thereafter tension the cable and to hold the tension until tension-holding elements are inserted, since the elastic properties of the cable are so great that the tension cannot be held, and the cable would spring back leaving no room for the tension-holding means.

In the present method, and with the present devices, the foregoing difficulties have been overcome.

SUMMARY OF THE INVENTION

One of the objects of this invention is the provision of an improved method if installing a single cable of a set thereof in a position suspending a drum from a sheave, while the drum and its load are carried by the other cables of the set.

Another object of the invention is the provision of a method of connecting sections of the terminal end portions of one of the cables of a set suspending a kiln or the like from overhead sheaves that includes the steps of: performing said sections along predetermined curves, then positioning said sections with one of their sides fully exposed around one of said sheaves and said kiln, then fully enclosing said sections and securing them together either in crossing relation or in a manner providing opposed reverse bends, and thereafter seating said cable against said sheave and kiln in operative driving relation thereto and tensioning said cable to substantially the load carrying tension of the other cables of said set.

A still further object of the invention is the provision of a method of connecting sections of the end portions of one of the cables of a set for forming a loop adapted to extend over one of the sheaves of said set and below a load-carrying drum therebelow for suspending said drum from said sheaves, which method includes the steps of: separately bending said sections along substantially corresponding curved paths for securement of said sections together in crossing or in opposed reverse bend relation at a point intermediate their ends and which sections when so bent will extend generally tangentially outwardly of said loop when the latter is in load carrying position about said sheave and drum, then holding said sections at their ends against unbending, then positioning said cable around said drum and thereafter securing said preformed end sections together at a point intermediate their ends to form said loop and seating said cable on said one sheave and against said drum, and finally tensioning said cable to approximately the same tension as the other cables of said set.

Added objects of the invention are prolongation of the life of the cable by shifting the location of bending without removing tensioning and the provision of apparatus for carrying out the aforesaid objects.

Other objects and advantages will appear in the description and drawings.

DESCRIPTIONS OF THE FIGURES

FIG. 1 is an end view of a cable-supported drum including a set of sheaves;

FIG. 2 is one of a pair of corresponding clamping devices for use on each of a pair of body members of a cable connector;

FIG. 3 is a top plan view of one of the devices of FIG. 2;

FIG. 4 is an elevational view of the inner side of one of a pair of corresponding body members of a cable connector;

FIG. 5 is an end view of a pair of body members of a cable connector, said members being spaced apart for clarity;

FIG. 6 is an elevational view of the outer side of the body member shown in FIG. 4;

FIG. 7 is a side elevational view of one side of the assembly of a pair of clamping devices of FIG. 2, secured on the outer side of one of body members of FIG. 6, a corresponding clamping device being secured on the opposite side of a pair of said members. Corresponding end sections of a cable are shown in broken line clamped between a pair of the body members with the ends of said sections being held by the clamping devices of FIG. 2;

FIG. 8 is an end view of the assembly of FIG. 7 with the ends of the cable sections being indicated;

FIG. 9 is a side elevational view showing the cable connector with a shifter bar mounted thereon, and the cable tensioned;

FIG. 10 is an end view of FIG. 9;

FIG. 11 is a sectional view along line 11—11 of FIG. 9;

FIG. 12 is a top plan view of FIG. 9 except the ferrules on the ends of the cables are a modification of the ferrules shown in FIG. 9;

FIG. 13 is a simplified side view of the shifter bar shown in FIG. 9 and is shown in a position spaced above the cable connector preparatory to being lowered onto the cable connector;

FIG. 14 is a simplified view of the cable connector shown in FIG. 7 after the clamping devices of FIG. 7 have been removed, and showing a side view of a shifter-installing device in a position taking up the slack at one end of the cable connector for installation of the shifter bar of FIG. 13;

FIG. 15 is an end elevational view of the shifter-installing device shown in FIG. 14;

FIG. 16 is a top plan view of a cable tensioner adapted to apply the desired tension on the cable after the slack has been taken up by the shifter installing device of FIG. 14 and the cable has been seated in a groove in its sheave. The tensioner is shown at one end of the shifter bar, the latter being broken in length;

FIG. 17 is a side elevational view of the tensioner of FIG. 16 shown associated with one end of the shifter bar and cable connector;

FIG. 18 is an elevational view of one of the shims adapted to be inserted between one end of the shifter bar and the ferrule having the flange thereon that is engageable with the tensioner;

FIG. 19 is a side elevational view of a device for shifting the cable connector relative to the cable to prolong the life of the cable; and FIG. 20 is a fragmentary top plan view of the ferrule engaging end of the device of FIG. 19 shown in engagement with the ferrule.

DETAILED DESCRIPTION

FIG. 1 shows one of many examples of a cable suspended drum or kiln in which a drum 1 is suspended from over head sheaves 2 by cables 3 which are usually in sets. Cables 3 may be of the same length in each set, each having a ferrule 5 swaged onto each of its terminal ends (FIG. 9).

In describing the ferrules, the words "inner" and "outer" are used with reference to the outermost ends of the cable, thus each ferrule 5 is adapted to seat at its inner end in a counterbore 6 in the outer end of a sleeve 7 that, in turn has a radially outwardly projecting flange 8 around its outer end. Sleeves 7 are positioned on the cable 3 before the ferrules are swaged thereon. The inner end of each ferrule will seat against the axially outwardly facing shoulder of the counterbore.

The modification in FIG. 12 shows the ferrule 10 having a radially outwardly projecting flange 11 integral therewith on its outer end.

The Cable Connector

In the present invention, the terminal end portions of the cable 3 are to be clamped together by a connector that in one preferred embodiment comprises a pair of correspondingly formed connector bodies 14 (FIG. 4–6). The bodies of the pair are generally oblong in outline, and for purpose of description they are shown horizontally and positioned vertically. The bodies 14 are each formed on one of their flat sides with outwardly opening corresponding recesses to receive sections of the terminal end portions of the cable 3 therein in crossing relation, which recesses are deepest at 16 at the crossing point of the sections (FIG. 5, 11). From this deepest part 16 the recesses have arms 17 that extend away from each along the upper longitudinally extending edges of the bodies 14 and which arms open outwardly at the ends of the bodies. A pair of downwardly diverging arms 18 of the recesses extend from parts 16 thereof to the lower edges of the bodies adjacent their ends, and a central bridge piece 19 along the lower edge of each body member 14 extends between the lower open ends of arms 18.

The sides 20 of bodies 14 along the bridge piece are bevelled to form a V-shaped ridge adapted to be received in the outwardly opening V-shaped groove 21 in sheave 2 (FIG. 11) when the flat inner surfaces of bodies 14 are clamped together to clamp the end sections together.

Cable Clamping Step

The recesses 16–18 are to receive sections of the terminal end portions of cable 3 in crossing relation at the deepest part 16 of the recesses when the end portions are connected. The terminal ends of each cable should be in the same plane as the loop, and as the cables are quite stiff and resilient, the task of positioning the end sections of the cable in the recesses and clamping them together is extremely difficult, particularly in cables for use in supporting brick lines kilns and their loads. It is not unusual for such kilns to be 20 feet in diameter.

By the present method and apparatus, the foregoing difficulty is overcome.

A clamping device, generally designated 25 (FIGS. 2, 3) is provided for each of two connector bodies 14. A device 25 is secured against the outer side of each body member 14 by cap screws 26 (FIG. 7) that extend through each device into threaded openings 28 (FIG. 6) in each body member 14. Each device 25 is provided with a screw actuatable clamp 29 at each of two diagonally opposite corners of the device.

After the clamping devices 25 are secured to the connector bodies 14 each device 25 is held in a shop vise and a section of the terminal end of the cable is readily bent, or sprung between the two diagonally opposite clamps 29 in a curve that approximately follows the path of the recesses across the inner face of the connector body from one outer end of arm 17 and across the central recess 16 to arm 18 and past the end of the bridge piece to the main portion of the loop. The ferrules are on the ends of the cable and one is adjacent the outer end of arm 17 of the recess.

At this point it is apparent that when the flat inner side of the bodies 14 are brought into opposed relation, the end sections of the cables that are forceably held along recesses 16–18 between the clamps 29 on clamping devices 25 will be in crossing relation, and upon drawing the bodies together the crossing cable sections will be forced into the recesses and will partially extend around each other at the crossing point in recesses 16.

Installation of Cable

The cables of a set are preferably of the same length. It is important that there is sufficient slack in the cable after the connector bodies are secured together to permit the loop to pass over a sheave when it is positioned around the drum. The cable is prepared so that this slack is equal to the length of a shifter bar that is secured on the connector as will later be explained.

The next step after the clamping devices have been secured on the body members 14 is to position the cable around the drum adjacent the sheave that is to support it. The bent sections are exposed along the recesses in the body members 14, and when the latter are brought into opposed relation with the crossing sections of the cables together, said bodies will be brought together by bolts 30 (FIG. 7). Said bolts extend through relatively large openings 31 in each device 25 while one bolt 30 extends past a cut-out portion in one of each device 25.

In the bolting operation, bolts 30 are positioned to assist guiding the bent sections of the cable into the recesses in the bodies 14 as the screws are tightened. Also this clamping of the cable sections will cause the latter to partially wrap around each other at their crossing point so that the portions of the cable that are at the ends of the connector will be in the same plane as the loop (FIG. 11). The terminal sections are now fully enclosed within the connector.

After the terminal end sections of the cable are clamped between the bodies 14 of the connector, the devices 25 are removed.

The cable connector assembly includes what is called a "shifter bar." This bar is seen in FIGS. 9-13 and is an elongated element formed with a channel extending longitudinally thereof (FIG. 11) adapted to slidably fit over the connecter body, which body, as a unit, is generally designated 34. Depending end pieces 35 on the ends of the shifter bar are formed with downwardly opening slots to pass the terminal end portions of cable with the ferrules 5 and sleeves 7 being outwardly of said end pieces.

In FIG. 13 the shifter bar 32 is positioned above the cable connector 34 for lowering onto the connector. The ferrules 5 and sleeves 7 on the ends of cable 3 are shown in broken lines in their positions after the devices 25 have been removed. It is apparent that, after devices 25 have been removed, the terminal ends of the cable with the ferrules and sleeves thereon must be moved away from the connector 34 to permit installation of the shifter bar. This operation is found to be awkward and impractical with conventional tools, but is readily accomplished with the specially designed tool 36 (FIG. 14).

Shifter Bar Installing Tool

Tool 36 is provided with pair of parallel, opposed arms 37, 38 one of the corresponding ends of which is forked and adapted to straddle the cable 3 at either end of the connector 34, with arm 37 against the end of the connector 34 and arm 38 against flange 8 (FIG. 14), or flange 11 on ferrule 10 (FIG. 12). A screw 39 is rotatably supported at one of its ends on arm 38 while arm 37 is threadedly supported on screw 39 for movement of the arms apart upon rotation of the hand wheel 40 on screw 39 on one direction to thereby move one end of cable 3 outwardly on the connector 34 to the full line position in FIG. 14 to enable one end of the shifter bar to be installed on the connector. A similar operation at the other end of the connector will move the other end of the cable 3 away from the connector 34 a sufficient distance to enable the complete installation of the shifter bar between the sleeves on ferrules 5. A guide sleeve 41 on arm 37 is slidable on a bar 42 that is rigidly connected at one end with arm 38 and at the other end with a frame member 43 that rotatably supports the end of screw 39 adjacent hand wheel 40.

The operation of tool 36 is adequate to remove the slack in cable 3 to enable the cable to be positioned on its sheave and in its groove in the sheave. The drum 1 of course has a similar groove around its periphery for the cable 3.

After the shifter bar is positioned on the body 34 it is adjustably secured thereon by a pair of cap screws 44 (FIG. 9) extending through openings in bar 32 and into a pair of threaded openings 5 in connector 34. The function of the shifter bar will be more fully explained later.

Cable Tensioner

After cable 3 is seated on its sheave it must be tensioned to a degree that will be approximately equal to the tension of the other cables of the set.

Tool 46 (FIGS. 16, 17) constitutes the cable tensioner and comprises a pair of spaced, parallel arms 47 connected to one of their ends of a cross bar 48, while their opposite ends have inturned portions 49 spaced apart at their inner ends. Said inner ends are formed with right angle notches 50 adapted to receive two opposite corners of one of the end pieces 35 on shifter bar 32 at points at two opposite sides of cable 3.

Tool 46 further includes an inner sleeve or ferrule engaging element 53 slidably supported between arms 47. Element 53 has parallel arms 54 that are respectively adjacent arms 47 and which arms 54 are connected by a cross bar 55 that is adjacent but spaced from cross bar 48. The ends 56 of arms 54 opposite cross bar 55 are also inturned and spaced apart to receive opposite sides of sleeve 7 adjacent flane 8 therebetween (FIG. 16). Thus the inturned ends 56 are engageable with the side of flange 8 that faces the end piece on the shifter bar 32.

An externally threaded bar 57 is secured at one end to cross bar 55 of element 53 and extends through an opening in cross bar 48. A nut 5 threadedly mounted on bar 57 reacts against cross bar 48 upon rotation of the nut in one direction to move the element 53 away from the shifter bar thereby pulling the end of cable 3 outwardly relative to the connector 34 and tensioning the cable 3. The same result would follow in FIG. 12 were the flange 11 engaged by the inturned ends of arms 54.

In the foregoing it should be noted that the ferrule at the other end of the cable engages the other end of the shifter bar when the cable is tensioned.

After the cable is tensioned to the desired degree, the necessary number of shims 59 (FIGS. 19, 20) are positioned between the end of the shifter bar and the sleeve 7 to maintain the tension, and then the tool may be removed without loss of tension.

A hydraulic cylinder could be substituted for the manually actuated expanding mechanisms of either the tool of FIG. 14 or the tensioner of FIG. 16.

Cable Shifting Tool

It has been found that, after long use, one or more of the wires of the cable may break, or tend to break at points adjacent the ends of the bridge piece 19. This appears to be due to the repeated slight flexing that occurs as the connector moves around the sheave. In my U.S. Pat. No. 3,669,433 it was explained that a slight shifting of the connector relative to the cable longitudinally of the latter effectively prolonged the life of each cable since the points of flexing would be shifted.

FIGS. 19, 20 show an easily applied and easily actuated tool 60 for accomplishing the foregoing results.

The cap screws 44 (FIG. 9) are first loosened or removed to release the connector 34 for movement relative to the shifter bar 32.

The tool 60 comprises an elongated rigid base member 63 which supports an upstanding lug 64 at one end, which lug is pivotally connected with one end of a plunger rod 65 that extends into one end of an hydraulic cylinder 66. The opposite end of cylinder 66 is provided with a ferrule engaging member 67 (FIG. 20). Hooks 68 on member 67 are adapted to engage the inner sides of flange 8 on the ferrule 5, or flange 11 on ferrule 10. The base member opposite lug 64 is adapted to engage the end of connector 34 nearest it.

Upon actuation of the cylinder 66 the base member will push the body (which has been released) to move the body 34 to the left as seen in FIG. 19 relative to the cable, and the cap screws may then be retightened or replaced in a pair of the threaded openings of the row indicated in broken lines in FIG. 9.

It is to be understood that the claims appeneded hereto are intended to cover all changes and modifications of the examples herein chosen for purposes of disclosure which do not depart from the spirit and scope of the invention.

I claim:

1. A method of installing and adjusting one of a set of sheave-supported, load-carrying cables respectively having continuing terminal end portions with enlargements at their terminal ends, which cables are each in the form of a loop in one plane extending generally annularly over one of said sheaves and below a drum for suspending said drum within said loop from said sheave, that includes the steps of:
    a. bending corresponding sections of said end portions along path extending generally tangentially of the loop to be formed by said cable; then
    b. holding each of said bent sections against unbending by holding forces applied to each of said end portions at the end of each section leaving one side of each section exposed and the other side closed; then
    c. forming a loop around one of said sheaves and said drum by slackly encircling one of said sheaves and said drum by said cable and positioning the exposed side of said sections in crossing relation and in engagement with each other at a crossing point intermediate their ends; then
    d. enclosing the exposed sides of said sections and clamping said sections together and partially wrapping one section around the other at said crossing point by applying pressures against said sides of said sections at opposite sides of said crossing point in directions to force the said clamped portions of said sections at said opposite sides into the said one plane of said loop and maintaining said pressures.

2. The method as defined in claim 1 that includes the steps of:
    e. removing said holding forces; then
    f. seating said loop on said sheave by removing the slack from said loop.

3. The method as defined in claim 2 that includes the step of:
    g. tensioning said cable to approximately the tension of the other load carrying cables of the set and locking said cable against loss of said tension.

4. The method as defined in claim 1 that includes the steps of:
    e. removing said holding forces; then
    f. removing the slack in said loop by applying a force against each of said enlargements in a direction longitudinally of said cable and oppositely outwardly of said loop until said cable and loop are substantially seated on said sheave and against said drum; then
    g. tensioning said cable and loop until the tension is approximately equal to the tension of each of the other load carrying cables of the set by applying a tensioning force on one of said enlargements longitudinally of said cable and outwardly of said loop while holding the enlargement on the other end of said cable stationary until said load on said cable is approximately equal to the load carried by the cables of the set, and then holding said tension substantially constant.

5. The method as defined in claim 3, including the steps of:
    h. thereafter shifting the location of said bending longitudinally along said sections of said end portions without removing said tensioning.

6. A method of installing one of a set of sheave-supported, load-carrying cables respectively having continuing terminal end portions with enlargements at their terminal ends, which cables are each in the form of a loop in one plane extending generally annularly over one of said sheaves and below a drum for suspending said drum within said loop from said sheave, that includes the steps of:
    a. bending corresponding section of said end portions along paths extending generally tangentially of the loop to be formed by said cable; then
    b. holding each of said bent sections against unbending by holding forces applied to each of said end portions at the end of each section leaving one side of each section exposed and the other side enclosed; then
    c. forming a loop around one of said sheaves and said drum by slackly encircling one of said sheaves and said drum by said cable and positioning the exposed sides of said sections such that said bending provides opposed reverse bends intermediate their ends; then
    d. enclosing the exposed sides of said sections and clamping said sections together and applying pressures against said exposed sides of said sections including said reverse bends into the said one plane of said loop and maintaining said pressures.

7. The method as defined in claim 6 that includes the steps of:
    e. removing said holding forces; then
    f. seating said loop on said sheave by removing the slack from said loop.

8. The method as defined in claim 7 that includes the steps of:
    g. tensioning said cable to approximately the tension of the other load carrying cables of the set and locking said cable against loss of said tension; and
    h. thereafter shifting the location of said bending longitudinally along said sections of said end portions without removing said tensioning.

* * * * *